No. 821,064.  
PATENTED MAY 22, 1906.

F. SIEBER.  
DYNAMO ELECTRIC MACHINE.  
APPLICATION FILED MAY 1, 1905.

WITNESSES:  
C. L. Belcher  
Otto S. Schairer

INVENTOR  
Ferdinand Sieber  
BY  
*[signature]*  
ATTORNEY

UNITED STATES PATENT OFFICE.

FERDINAND SIEBER, OF WILKINSBURG, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

No. 821,064. Specification of Letters Patent. Patented May 22, 1906.

Application filed May 1, 1905. Serial No. 258,321.

*To all whom it may concern:*

Be it known that I, FERDINAND SIEBER, a subject of the Emperor of Austria-Hungary, and a resident of Wilkinsburg, in the county of Allegheny and State of Pennsylvania, have invented a new and useful Improvement in Dynamo-Electric Machines, of which the following is a specification.

My invention relates to dynamo-electric machines, and particularly to those in which the speed may be varied by varying the amount of resistance in circuit with the field-magnet winding.

The object of my invention is to provide improved means for enabling motors of the above character to operate at varying speeds and in either direction without shifting the commutator-brushes and without injurious sparking between the commutator-bars and the brushes.

It has heretofore been proposed to provide the field-magnet frame of electric motors with auxiliary polar projections of relatively small cross-sectional area which alternate in position with the main polar projections and which are provided with coils that are connected in series with the armature-winding for the purpose of preventing injurious sparking between the commutator-bars and the brushes when changes in speed are effected and when the direction of rotation is reversed.

My invention is an improvement over such means; and it consists in concentrating the convolutions of the coils of the auxiliary winding as near the armature as possible, so that the winding may serve both as an effective compensating winding for the field produced by the ampere-turns of the armature and as an exciting-winding for commutating-poles.

Figure 1:
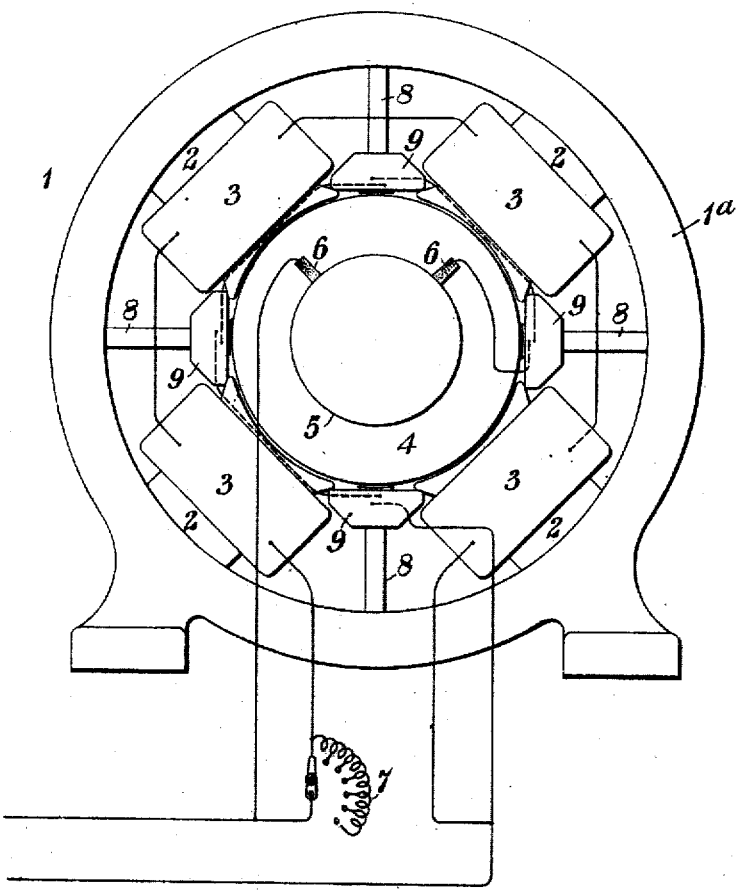
Figure 2:
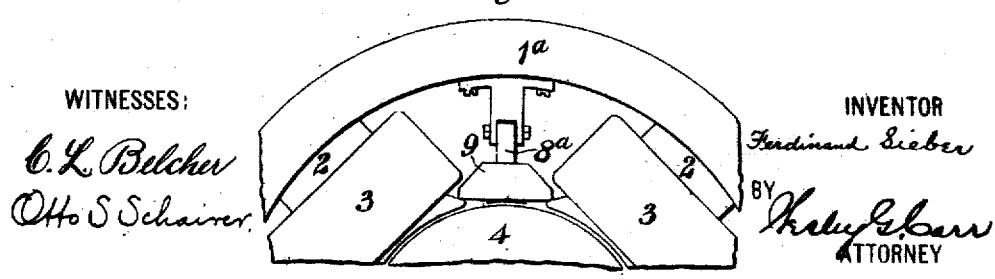

Figure 1 of the accompanying drawings is a partially-diagrammatic view, in side elevation, of a motor constructed in accordance with my invention; and Fig. 2 is a similar view showing a modification of the structure of Fig. 1.

Referring to Fig. 1 of the drawings, the motor 1 is shown as comprising a field-magnet frame 1ª, having main polar projections 2, that are provided with magnetizing-coils 3 and an armature 4, the coils of which are connected in the usual manner to the bars of a commutator-cylinder 5, with which brushes 6 engage. The field-magnet winding consisting of the coils 3 is shown as connected in shunt to the armature-winding, and if it is so connected or if it is excited from an independent source the amount of current that traverses it may be varied by varying the amount of a resistance 7 that is included in circuit with it. Although I have illustrated a motor the main field-magnet winding of which is of the shunt variety, such illustration is not to be construed as excluding any other known variety of field-magnet winding or windings the use of which may be desired. Secured to the field-magnet frame 1 and alternating in position with the polar projections 2 are auxiliary polar projections 8 of small cross-sectional area as compared with the cross-sectional area of the polar projections 2, coils 9 being placed upon the polar projections 8 and connected in series relation with the armature-winding. The coils 9 are so formed as to bring the component convolutions as near to the armature as possible and to occupy the spaces between the main polar projections and their coils. The convolutions of the coils 9 are concentrated as near the armature as possible in order that they may serve to compensate portions of the field produced by the ampere-turns of the armature and at the same time serve as exciting-coils for the polar projections 8 and enable the motor to effect good commutation in accordance with principles well understood by those skilled in the art.

If, as has been the usual practice, the convolutions of the coils 9 were distributed along the lengths of the polar projections 8, comparatively little compensating effect would be obtained; but if the coils are formed and located in accordance with my invention the flux due to current traversing the coils is directly opposed to the flux due to the armature ampere-turns, and being close to the armature comparatively little leakage results.

If the convolutions of the coils 9 were distributed along the length of the auxiliary pole-pieces, poor speed regulation and a tendency to hunting would occur in case the pole-pieces should become magnetically saturated. If, however, the convolutions are concentrated close to the armature, the forces exerted by the coils in opposition to field distortion and armature reaction will vary as the amount of armature-current varies and be independent of the saturation of the pole-pieces, so that good speed regulation and good commutation may be obtained and all tendency to hunting be avoided under all conditions of operation.

Instead of securing the auxiliary polar projections to the field-magnet frame, as shown in Fig. 1, they may be otherwise supported—as shown, for example, in Fig. 2 at 8ª—without sacrificing the advantages of my invention; but substantially the structure shown in Fig. 1 will generally be found more satisfactory as regards both manufacturing and operating conditions.

I claim as my invention—

1. In a dynamo-electric machine, the combination with an armature, of a field-magnet frame provided with main polar projections and with auxiliary polar projections of smaller cross-section that are located between the main polar projections and are provided with coils that are concentrated in close proximity to the armature.

2. In a dynamo-electric machine, the combination with an armature, of a field-magnet frame provided with main polar projections and with auxiliary polar projections of smaller cross-section that are located intermediate the main polar projections and are provided with coils that are concentrated in close proximity to the armature and are connected in series with the armature-winding.

3. In a dynamo-electric machine, the combination with an armature, of a field-magnet frame that is provided with sets of alternately-disposed polar projections having windings that are connected respectively in series and in shunt relation to the armature-winding, the coils of the series-connected winding being concentrated near the armature.

4. In a dynamo-electric machine, the combination with an armature, of a field-magnet frame provided with sets of alternately-disposed polar projections of respectively different cross-sectional area and windings therefor that are connected respectively in series and in shunt relation to the armature-winding, the coils of the series-connected winding being concentrated near the armature.

5. In a dynamo-electric machine, the combination with an armature, and a field-magnet frame having a set of main pole-pieces, and a set of auxiliary pole-pieces that alternate in position with the main pole-pieces, of a set of coils for the auxiliary pole-pieces that are concentrated adjacent to the armature and constitute a compensating and regulating winding.

6. In a dynamo-electric machine, the combination with an armature, of a field-magnet having a set of main coils and a set of auxiliary coils that alternate in position with the main coils and are concentrated adjacent to the armature to constitute a compensating and regulating winding.

In testimony whereof I have hereunto subscribed my name this 28th day of April, 1905.

FERDINAND SIEBER.

Witnesses:
   OTTO S. SCHAIRER,
   BIRNEY HINES.